United States Patent

[11] 3,530,878

| [72] | Inventor | Thaddeus S. Janton<br>2545 W. Walton St., Chicago, Illinois 60622 |
|---|---|---|
| [21] | Appl. No. | 614,777 |
| [22] | Filed | Feb. 6, 1967 |
| [45] | Patented | Sept. 29, 1970 |

[54] VERTICAL UNION CHECK VALVE
2 Claims, 5 Drawing Figs.

[52] U.S. Cl. .................................................. 137/512.1, 137/515.7
[51] Int. Cl. .................................................. F16k 15/00
[50] Field of Search .......................................... 137/512.1, 515.7, 527, 527.2, 315; 251/308

[56] References Cited
UNITED STATES PATENTS
3,074,427  1/1963  Wheeler .................. 137/512.1
3,176,712  4/1965  Ramsden .................. 137/515.7X
3,374,804  3/1968  Stegerud .................. 137/515.7X

*Primary Examiner*—William F. O'Dea
*Assistant Examiner*—Howard M. Cohn
*Attorney*—Alberts, Brezina and Lund

ABSTRACT: Check valve in which a narrow central piece extends transversely across a passage in a body member to provide two separate parallel passage portions around which valve seat surfaces are formed for engagement by pivotal flap valves to provide fluid-tight seals. Stop means are provided to limit pivotal movement of the flap valves and to insure closure of the valves from back fluid pressure. The body member is mounted in a union including an outer member which is slotted to permit removal and replacement of a body member and the valve structure.

Patented Sept. 29, 1970

INVENTOR.
BY Thaddeus S. Janton

VERTICAL UNION CHECK VALVE

The invention to be known as the Vertical Union Check Valve, relates to the improvement of the union, by incorporating a novel check valve with novel structural features.

The object of the invention is to enable the unit, to wit the union to perform a dual purpose, first to join pipe, and second to allow the flow of liquids, gases, steam, etc. in one direction, and prohibiting or checking the flow in the opposite direction. Another object of invention is to embody the check valve by constructing the face portions of the two union members so as to provide a seat and seal for the mounting of the check valve. A further object of the invention is to allow the replacement of the check valve when worn, through the slot opening without the complete disassembly of union.

In describing the invention in detail, reference will be made to the accompanying drawing in which.

Figure 2:
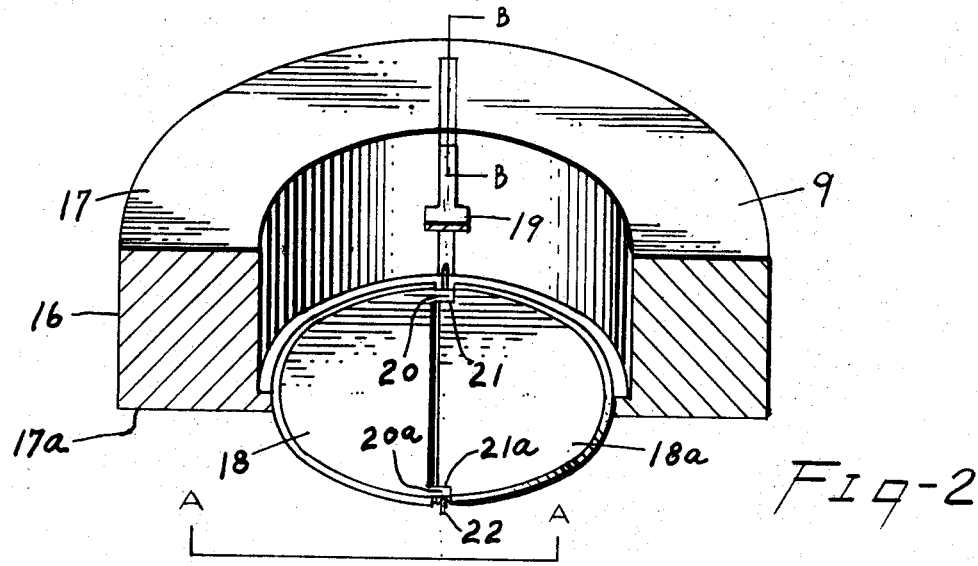
FIG. 2 is an enlargement of the check valve, twice the scale of FIG. 1, done in an elliptical view on a horizontal plane, partly in section to allow for thorough understanding of construction.
Figure 5:
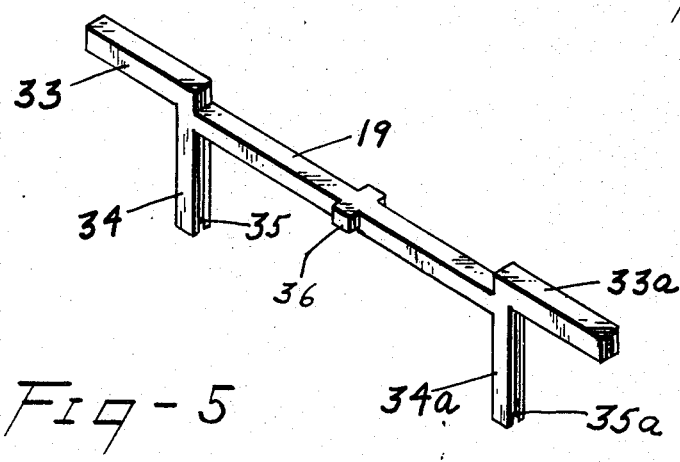
Figure 4:
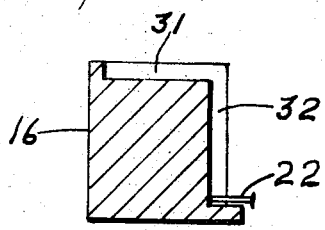

FIG. 4, same scale as FIG. 2, is check valve body member, section BB of FIG. 2, showing slots incorporated in body; and FIG. 5 is a bridge in perspective which spans the inside diameter of check valve body.

Figure 1:
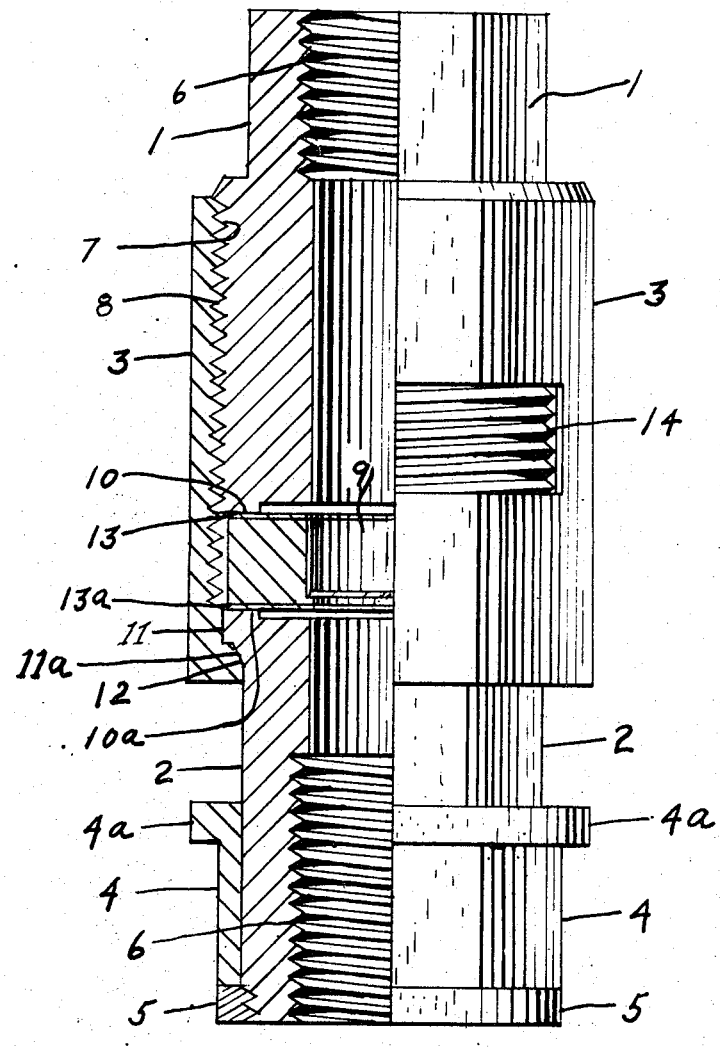
FIG. 1 is an elevational view partly in section and partly in elevation showing assembly of a union embodying my improvement, showing the union having flap annular shoulders and having the check valve in normal position.

FIG. 1 and 2 are passaged body members with identical annular end faces. Numeral 3 designates the internally threaded and flanged coupling nut of the union. Numeral 4 is a sleeve member with an integral annular shoulder 4a which acts as a stop for nut 3. This provides for spreading or separation of the union when it is desired to replace check valve.

Numeral 5 designates an additional internally threaded member or ring which screws onto lower body member 2, thereby holding member 4 in place.

Body members 1 and 2 are each provided with the standard interior screw threaded portion 6 to receive threaded end portions of a pipe. Member 1 is provided with the exterior enlarged screw threaded portion 7 to be engaged by the interior threaded portion 8 of coupling nut 3. Body member 2 has an integral annular flange 11, with an adjacent beveled shoulder collar 11a for centering purposes on the exterior adapted to be engaged by flange 12 upon the interior of coupling nut 3.

The body members 1 and 2 illustrated in the figure are each provided with identical annular faces, and each thereof is provided with a flat annular shoulder, designated as 10 and 10a respectively. Said annular shoulders 10 and 10a seat and seal check valve 9, details of which are in FIGS. 2, 3, 4, and 5. Numerals 13 and 13a are gaskets, made of suitable materials, to insure a proper seal for check valve. 13 and 13a are not shown in FIGS. 2, 3, and 4.

Numeral 14 is an enlarged slot opening or aperture cut into coupling nut 3, and which is of a size sufficient to permit insertion of check valve.

FIG. 2 check valve 9, having an annular passage body member 16, with identical faces 17 and 17a having flat annular shoulders as seats, when in contact with faces of members 1 and 2 of union. Numerals 18 and 18a designate the half moon shaped flaps which open and close depending upon the direction of flow. Numeral 19 is a bridge, spanning the inside diameter of body member 16. Flap 18 has connecting ears 20 and 20a which overlap into niches 21 and 21a of flap 18a, these ears 20 and 20a, have holes in them which align with hole in flap 18a, pin 22 joins both flaps 18 and 18a forming the axis for the rotation of the flaps.

Figure 3:
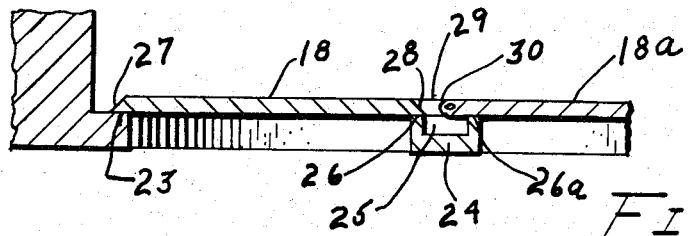
FIG. 3 is a further enlargement of lower counterpart of check valve shown as section AA of FIG. 2, twice the scale of FIG. 2, allowing for clarity of detail, showing slotted center piece and pin through flaps, which permit the opening and closing of flaps.

FIG. 3 section AA depicting integral annular shoulder with flat face 23 serving as stop and seat for flap 18 and 18a, slotted central piece 24, not shown in FIG. 2, running the length of inside diameter of inner wall of body member 16, slot 25 is provided to prevent obstruction in the process of opening of flaps 18 and 18a, flat shoulders 26 and 26a of central piece 24 serve as individual stops and seals for flaps 18 and 18a. Numeral 27 is beveled edge of circular end of flap 18, numeral 28, the straight end of flap 18 is also beveled and ends at the connecting ears 29 of flap 18. Twenty-nine is numeral 20 in FIG. 2. Numeral 30 is straight end of flap 18a which is round in section, said straight ends 28 and 30 allow for the opening of flaps 18 and 18a without obstruction.

FIG. 4 section BB showing horizontal slot 31 and vertical slot 32 incorporated in top and in inner wall of body member 16 respectively, not shown in FIG. 2, slots 31 and 32 are of such width, length, and depth as to receive the horizontal and vertical leg of bridge 19, preventing legs from protruding, and allowing said legs to be flush with top and flush with inner wall of body member 16. The length of slot 31 is such, as to allow flat annular shoulder 10 of union member 1, to overlap and seat simultaneously leg of bridge 19, with seat 17 of body member 16 of check valve. Numeral 22 shows position of pin beyond inner wall of body member 16, extending the full depth of vertical slot 32.

FIG. 5, same scale as FIG. 2, is perspective view of bridge 19, showing horizontal legs 33 and 33a along with vertical legs 34 and 34a, said legs slide into slots 31 and 32 of body member 16 of check valve 9. Numerals 35 and 35a are slotted undersides, the width and shape being identical to outer dimensions of pin 22, said slots receive, and act as bushing for pin 22. Numeral 36 is a stop, provided to insure closing of said flaps, by allowing back pressure to be exerted on faces of flaps in contact with stop 36.

My novel construction provides for a check valve which is inexpensive to manufacture, having for main parts body and bridge which may be cast, and having very few machining operations. Also with union, provides for relatively quick and easy removal and replacement of check valve, which replacement may be necessitated, by substantial wear and deterioration. This avoids the dismounting and disassembly of the connected pipes and fittings which thereby eliminate substantial labor and expense.

I claim:

1. In a valve construction, a body member having a passage therethrough, a pair of flap valves in said passage, means supporting said flap valves on an axis extending transversely across said passage for pivotal movement between open positions in which said flap valves are positioned generally parallel to each other and to fluid flow through said passage and closed positions in which said flap valves are generally in a plane transverse to said passage, and a narrow central piece extending transversely across said passage adjacent said axis to divide said passage into two separate parallel passage portions, said body member and said central piece being formed to provide a pair of valve seat surfaces for engagement by front surface portions of said flap valves in said closed positions thereof and to provide fluid-tight seals, said valve seat surfaces extending completely around both of said separate parallel passage portions, said body member being provided with horizontal and vertical slots, said slots being recessed in the top face and inner wall of the body member, said body member being provided with second identical recessed horizontal and vertical slots opposite from the first, said means for supporting said flap valves for pivotal movement including a flap pin jointing both of said valves and forming the axis of rotation upon which said flap valves open and close, said flap pin having ends extending into said vertical slots of the inner wall of the body member, a bridge extending across said body member having horizontal and vertical legs at each end received in the respective horizontal and vertical slots and opposite end of the body member so as to be flush with the top face and inner wall of said body member, the lower end of each said vertical leg cooperating with said pin so as to retain the same seated at the bottom of said vertical slots, said flap valves being semicircular in shape, one of said flap valves having a beveled edge on both the circular and straight ends thereof with two protruding connecting ears being located at the extreme ends of the straight end thereof, said connecting ears being overlapped into niches of the extreme ends of the straight end of the other flap valve, said other flap valve having a round edge for the straight end, said straight end of said other flap valve and connecting the ears of said one flap valve being provided with holes therethrough through which said pin extends.

2. In a valve construction, a body member having a passage therethrough, a pair of flap valves in said passage, means supporting said flap valves on an axis extending transversely across said passage for pivotal movement between open position in which said flap valves are positioned generally parallel to each other and to fluid flow through said passage and closed positions in which said flap valves are generally in a plane transverse to said passage, and a narrow central piece extending transversely across said passage adjacent said axis to divide said passage into two separate parallel passage portions, said body member and said central piece being formed to provide a pair of valve seat surfaces for engagement by front surface portions of said flap valves in said closed positions thereof and to provide fluid-tight seals, said valve seat surfaces extending completely around both of said separate parallel passage portions, first and second union members on opposite sides of said body member having passages therethrough aligned with said passage of said body member, a third union member threaded on said first union member, cooperating shoulders on said second and third union members for moving said second union member toward said first union member to clamp said body member with a fluid-tight seal therebetween, said third union member having an opening in a side wall thereof larger than said body member to permit sidewise removal and replacement of said body member therethrough.